UNITED STATES PATENT OFFICE.

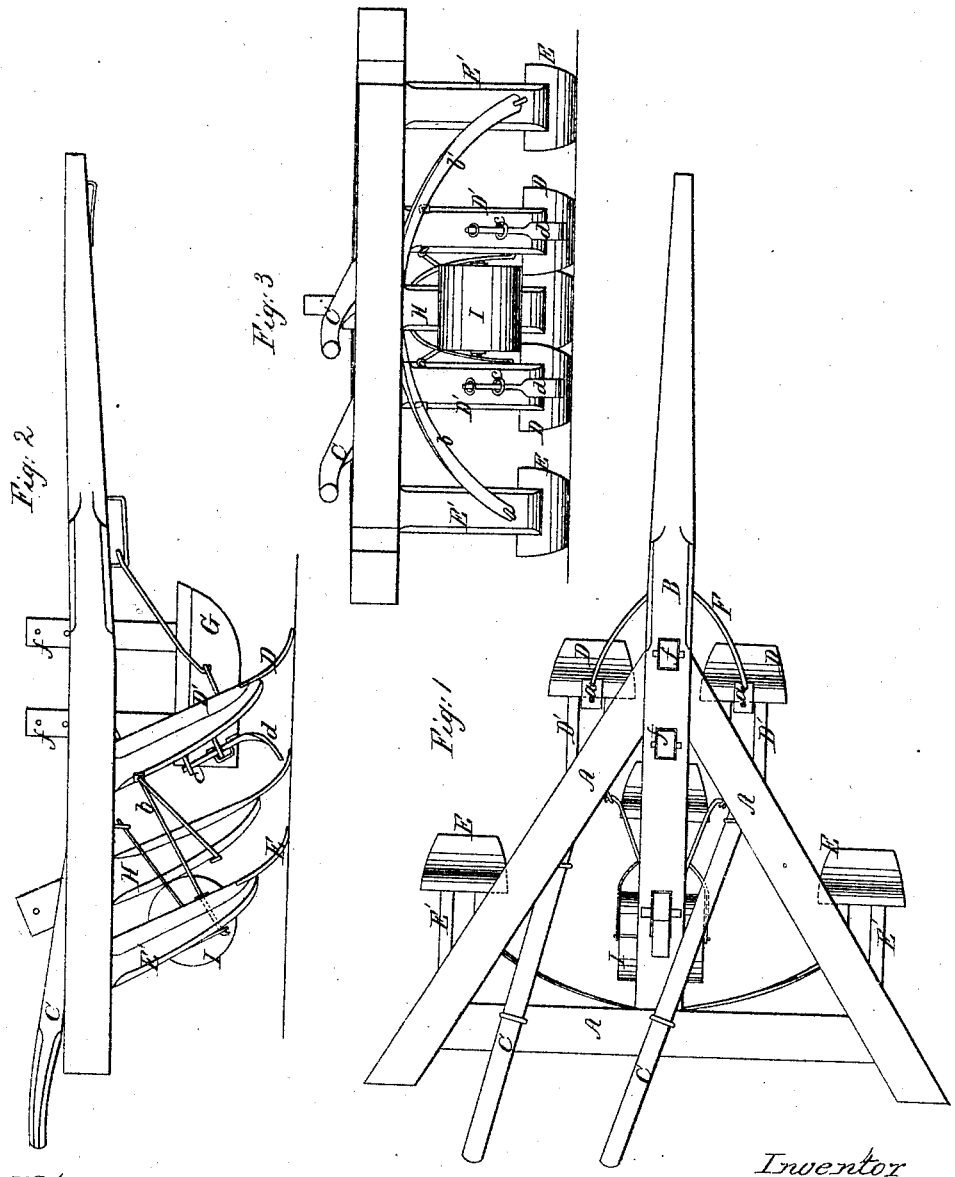

D. G. BLUE, OF WINFIELD, IOWA.

IMPROVEMENT IN CULTIVATORS.

Specification forming part of Letters Patent No. 37,271, dated January 6, 1863.

*To all whom it may concern:*

Be it known that I, D. G. BLUE, of Winfield, in the county of Henry and State of Iowa, have invented certain new and useful Improvements in Combined Corn-Plow and Cultivator; and I do hereby declare that the following is a full, clear and exact description of the same, reference being had to the accompanying drawings, forming a part of this specification, in which—

Figure 1 represents a plan view of the machine. Fig. 2 represents a side view, and Fig. 3 represents a rear view.

In the drawings, A A A represent the main frame combined with the tongue-piece B, and C C are the handles, arranged in an inclined position, so as to enable the operator to conduct the machine without traveling on the young plants on the hills of corn.

D D represent two front plows fastened to posts D' D', which extend down from the main frame, and E E two other plows fastened to two other posts, E' E', which extend down from the rear of the main frame, the latter being shorter than the former, for the purpose of elevating the tongue to give the machine less weight on the necks of the horses.

F is the draft-connection, its rear ends being hooked or otherwise connected to the front pieces, $a\ a$, on the posts D' D', said pieces $a\ a$ being provided with holes to adjust the draft-connection for different horses, or to suit the circumstances under which the machine is to be used. This mode of connecting the team renders the draft light and relieves the necks of the horses, the tendency of the draft being to elevate the front of the tongue. The rear posts are connected to the front ones by rods $b\ b$. To the rear of the front posts are fastened guide-rings $c\ c$, or their equivalents, for supporting the gage runners or shoes $d\ d$, the latter being held at different heights from the surface of the ground by means of adjusting hooks or pins $e\ e$, inserted in holes in the upper ends of gage $d\ d$, as clearly seen in the drawings. Any other convenient mode of adjustment can be employed.

G is a bottomless shield-box, suspended from the tongue by means of two uprights, $f\ f$, provided with holes, so that said box can be suspended at different heights from the ground. The position of the shield-box is just between the two front plows, and its object is to protect the young plants of corn from being covered up and mashed by clods of earth thrown inward by the front plows.

Operation: When the machine is to be used to cultivate corn the center post, H, and roller I are removed, the shield-box G adjusted so as to run clear of the tops of the young plants, and the gage-runners $d\ d$ adjusted so as to cause the plows to run at the desired depth. As the machine is drawn forward by the team the front plows work up and pulverize the soil close up to the young plants, while the box G covers and protects the tops of the young plants from injury, as above stated. The rear plows loosen up the earth between the rows. The plows are all set so as to throw the earth toward the plants, and the shield-box G, while it protects the plants from being injured by lumps and sods and like obstructions, does not prevent the fine earth from being worked up and around the plants by the front plows.

When the machine is to be used to cover corn that has been dropped in rows the roller I is connected to the frame, so as to be drawn along on the surface of the ground just in rear of the shield-box G, which serves to keep large bunches of earth from being thrown upon the corn, while permitting the fine and pulverized earth to be thrown over the seed by the front plows. The roller presses down and leaves the earth which covers the corn or other seed smooth and even, while the rear plows work up and cultivate the earth between the rows.

When the machine is to be used as a common cultivator to prepare the ground for seed, then the roller I and box G are both removed and the center plow, H, put in place.

The advantages of the above machine to the farmer are very great. It saves the expense of purchasing several machines, while at the same time it does its work well in whatever capacity it is used.

Having described my improvement, what I claim as my invention, and desire to secure by Letters Patent, is—

1. The rear posts, when made shorter than the front ones, in combination with the use of an adjustable draft-connection, substantially as and for the purposes set forth.

2. The combination of the gage-runners $d\ d$ with the front posts, substantially as and for the purposes stated.

3. The combination, with the frame, of the removable shield-box G, plow H, and roller I, substantially as set forth.

D. G. BLUE.

Witnesses:
WM. G. LAUDER,
JAS. B. LYNCH.